July 21, 1942.  A. L. KNOX ET AL  2,290,372
AUTOMATIC RECORD CHANGING APPARATUS
Filed June 18, 1940  5 Sheets-Sheet 1
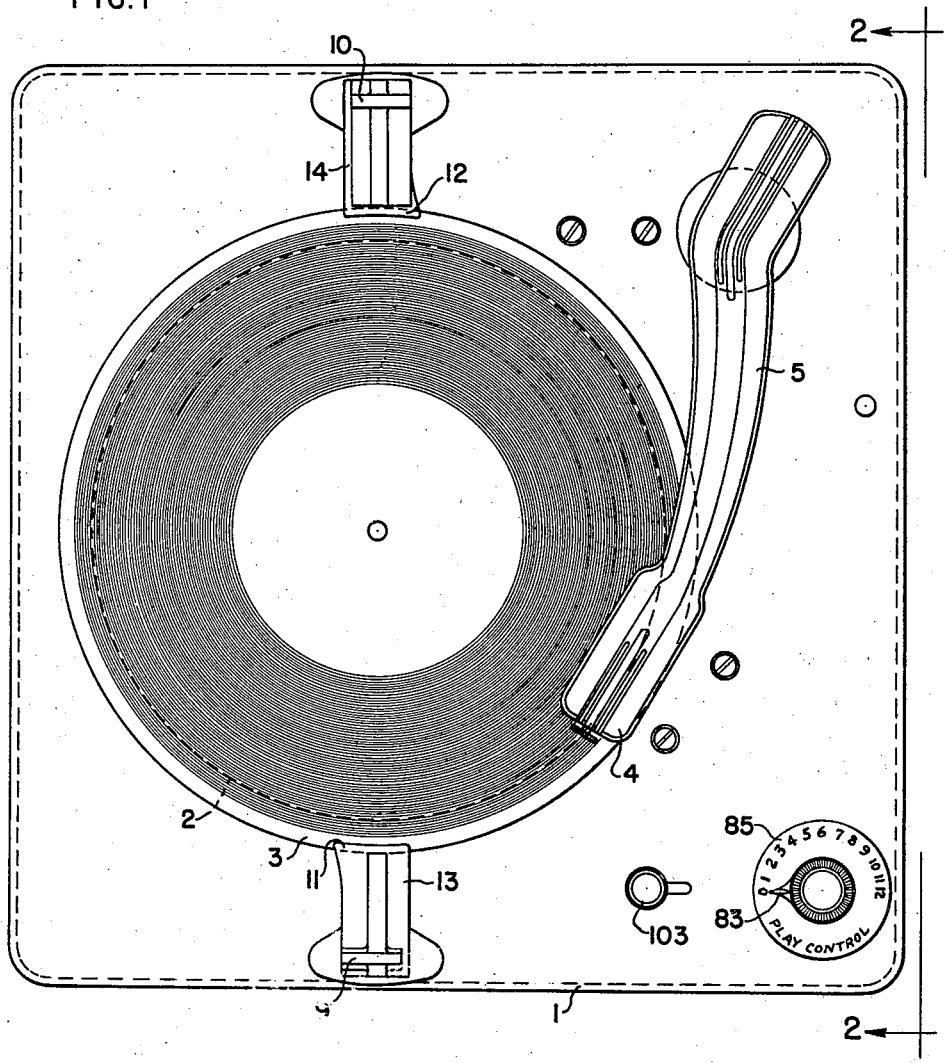
INVENTORS
ARTHUR L. KNOX
FRITZ KAHL
BY
ATTORNEY July 21, 1942.   A. L. KNOX ET AL   2,290,372
AUTOMATIC RECORD CHANGING APPARATUS
Filed June 18, 1940   5 Sheets-Sheet 2
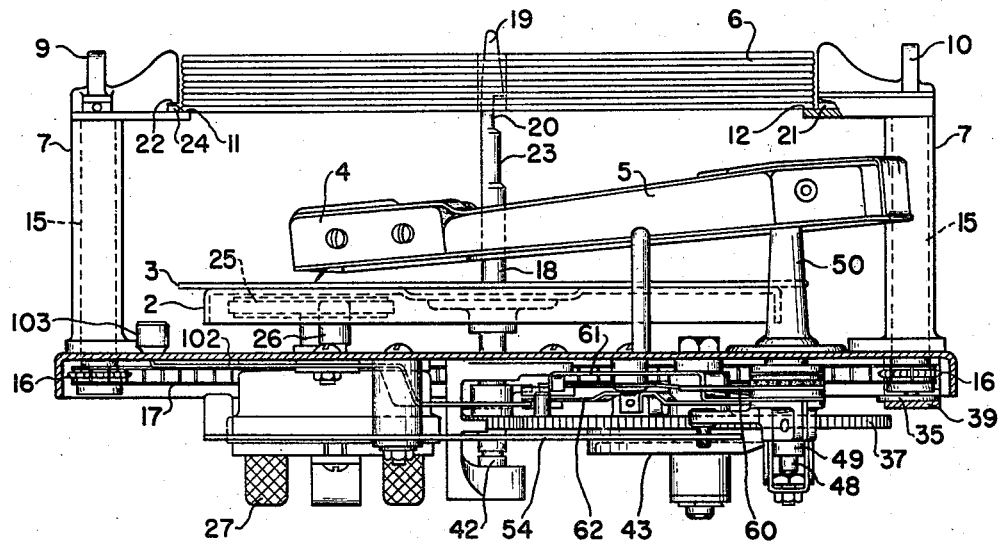
INVENTORS
ARTHUR L. KNOX
FRITZ KAHL
BY
ATTORNEY July 21, 1942. A. L. KNOX ET AL 2,290,372
AUTOMATIC RECORD CHANGING APPARATUS
Filed June 18, 1940 5 Sheets-Sheet 3
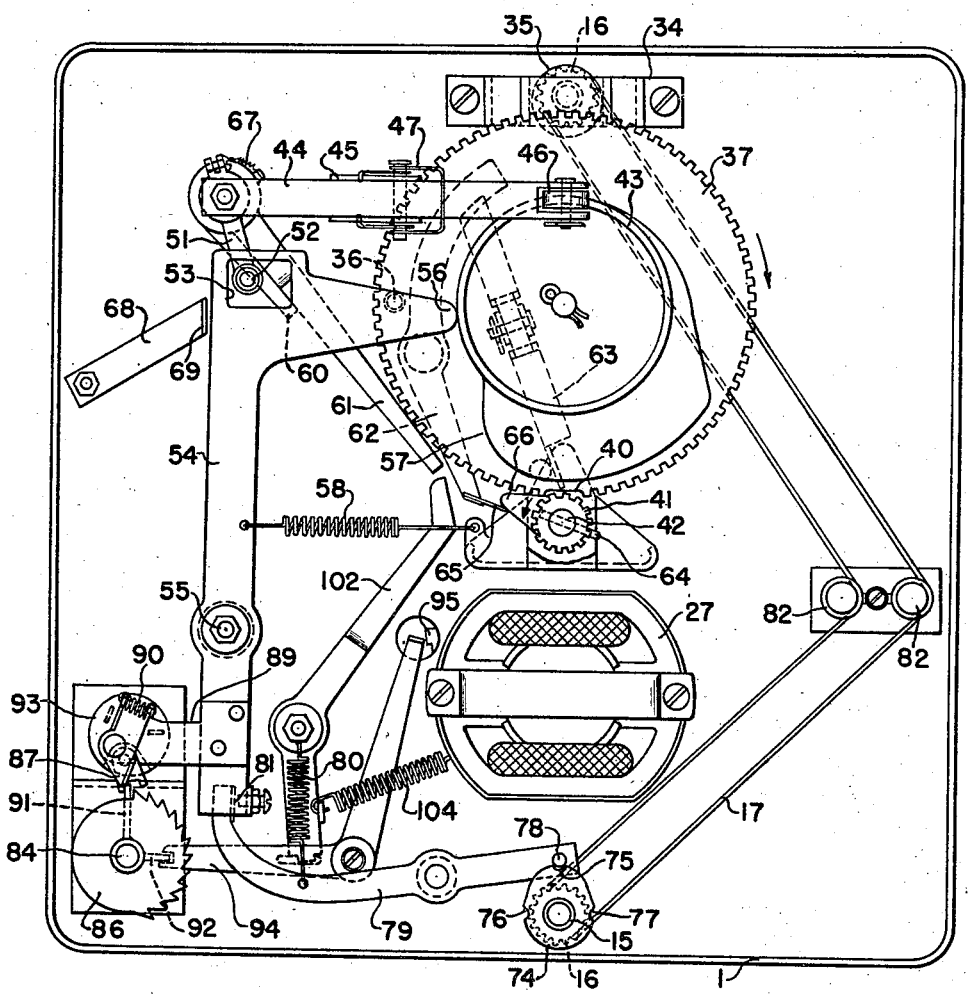
INVENTORS
ARTHUR L. KNOX
FRITZ KAHL
BY
ATTORNEY July 21, 1942.   A. L. KNOX ET AL   2,290,372
AUTOMATIC RECORD CHANGING APPARATUS
Filed June 18, 1940   5 Sheets-Sheet 4
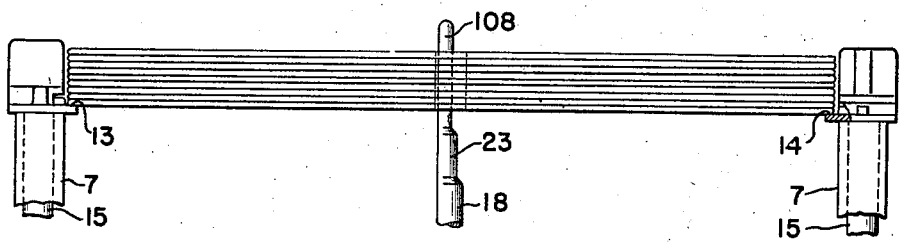
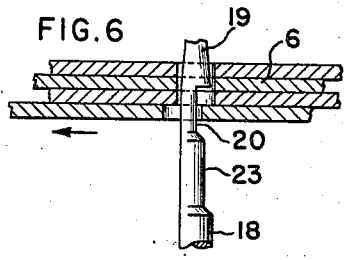
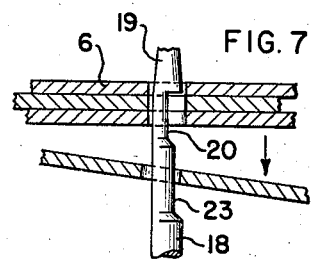
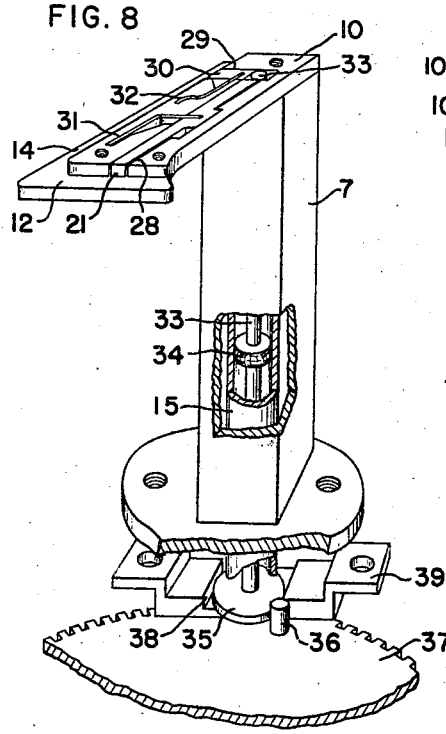
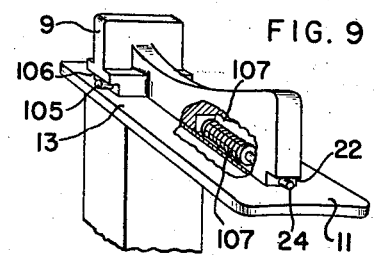
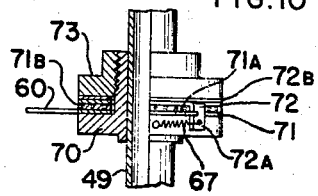
INVENTORS
ARTHUR L. KNOX
FRITZ KAHL
BY
ATTORNEY

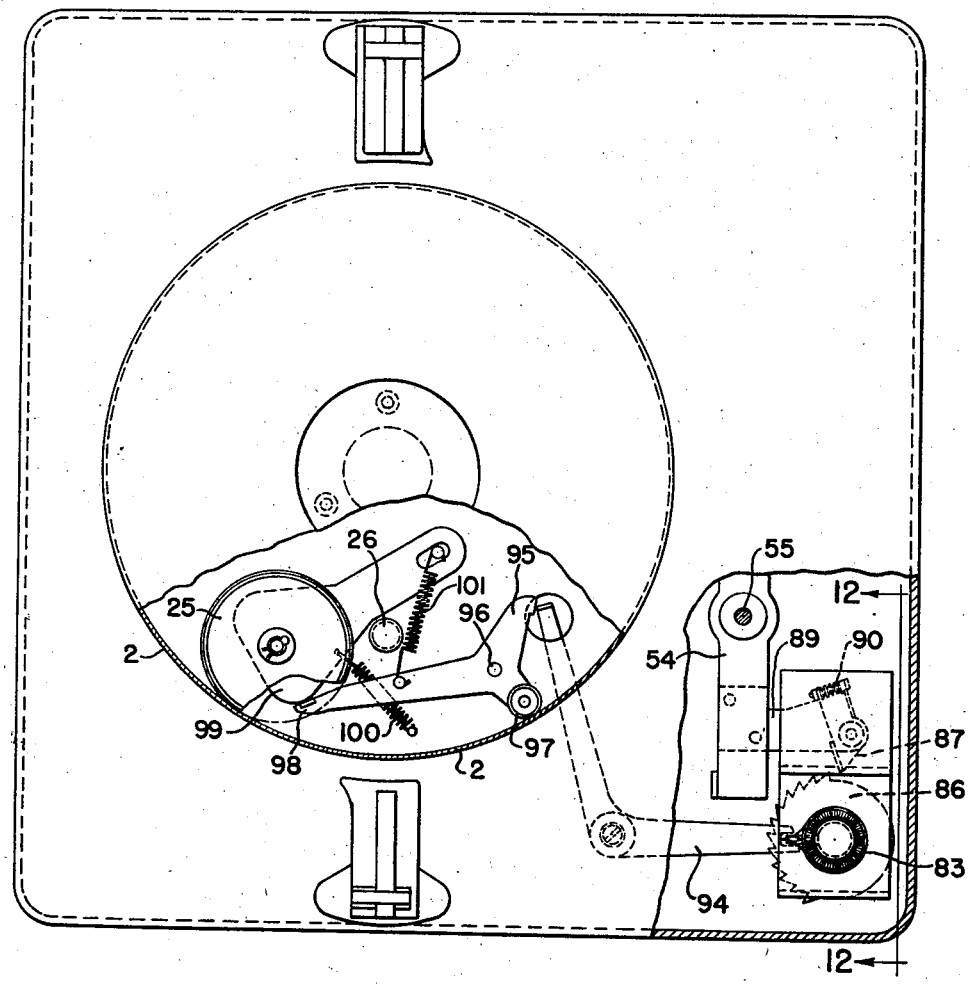
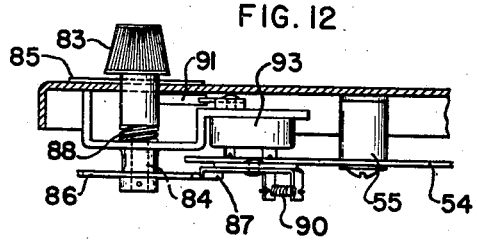

Patented July 21, 1942

2,290,372

UNITED STATES PATENT OFFICE 2,290,372

AUTOMATIC RECORD CHANGING APPARATUS

Arthur L. Knox and Fritz Kahl, Fort Wayne, Ind., assignors to Farnsworth Television and Radio Corporation, a corporation of Delaware Application June 18, 1940, Serial No. 341,176

10 Claims. (Cl. 192—120)

This invention relates to phonograph apparatus, and more particularly to control mechanism in such apparatus.

An object of the present invention is to provide a compact record-changing apparatus of improved and simplified construction.

A further object of the invention is to provide improved turntable driving mechanism.

A further object of the invention is to provide improved mechanism for automatically stopping the rotation of a turntable after a predetermined number of records has been played.

A further object of the invention is to provide apparatus which will play a predetermined number of records and then shut off automatically.

A further object of the invention is to provide a record-changing apparatus which will play a predetermined number of records and, after the apparatus is in operation, indicate how many more records will be played before the apparatus will shut off automatically.

The invention possesses other objects and features which will be clear from the following description, taken in connection with the accompanying drawings.

In accordance with the present invention, there is provided an automatic phonograph which includes a turntable, driving means and turntable control mechanism. The turntable control mechanism comprises movable connecting means for operatively connecting the turntable to the driving means for driving the turntable, resilient means connected to the movable connecting means for normally holding the movable connecting means in operative engagement with the turntable and the driving means, indicator means associated with the movable connecting means, and a pick-up arm associated with said indicator means for cooperating with a record on the turntable. The indicator mechanism is adapted to be moved to an on-position for permitting the movable connecting means to move into engagement with the turntable and the driving mechanism. The indicator mechanism is also adapted to be moved automatically by the pickup arm after a predetermined number of records has been played on the turntable to an off-position for moving the movable connecting means out of engagement with the turntable and the driving means.

In one embodiment of this invention, the driving means comprises a motor with a driving member. Also, there is provided means associated with the indicator means for starting the motor when the indicator means is moved to the on-position and for stopping the motor when the indicator means is moved to the off-position.

In accordance with another feature of the present invention, there is provided an automatic phonograph which includes a turntable, driving means, and a turntable control mechanism. The turntable control mechanism comprises first movable connecting means for operatively connecting the turntable to the driving means for driving the turntable, first resilient means connected to the first movable connecting means for normally holding the first movable connecting means in operative engagement with the turntable and the driving means, and second movable connecting means associated with the first movable connecting means. The second movable connecting means is provided with a braking means and has connected thereto a second resilient means for normally maintaining the second movable connecting means in engagement with the first movable connecting means. While the second resilient means and the second movable connecting means are in their normal positions, the first movable connecting means is out of its operative position and the braking means is maintained in frictional engagement with the turntable. An indicator means is associated with the second movable connecting means and a pickup arm. The indicator means is adapted to be moved to an on-position for moving the second movable connecting means out of engagement with the first movable connecting means. Also, the indicator means is adapted to be moved automatically by the pickup arm after a predetermined number of records has been played on the turntable to an off-position for moving the second movable connecting means into engagement with the first movable connecting means.

In the drawings:

Fig. 1 is a top plan view of the record changer with the unplayed records removed;

Fig. 2 is a side elevation of the record changer of Fig. 1, showing a group of records supported over the turntable and one record on the turntable in playing position, as viewed from the line 2—2 of Fig. 1;

Fig. 3 is a rear elevation of the record changer, showing the cam arrangement for raising and lowering the pickup arm;

Fig. 4 is a bottom plan view of the underside of the record-changing mechanism;

Fig. 5 is a partial side elevation, showing a modified form of spindle and the record supports moved to a position where they can support larger records;

Figs. 6 and 7 are fragmentary views showing various positions of records in relation to the centering spindle, at closely-spaced intervals of time after the lowermost record has been moved to release it from the supports;

Fig. 8 is a perspective of one record support, with the cover removed and with the pedestal partially in section;

Fig. 9 is a perspective of another record support showing certain details of its construction;

Fig. 10 is a view of a friction clutch assembly used in the mechanism;

Fig. 11 is a view showing an assembly of the play-control mechanism and the braking device; and Fig. 12 is a fragmentary view showing the switch provided for shutting off the mechanism in engagement with the play-control device.

Referring now more particularly to Fig. 1 of the drawings, the invention there illustrated is embodied in a record-changing apparatus having a base plate 1 supporting a horizontally rotatable turntable 2 upon which is shown a record 3 in position for reproduction. A reproducer 4 is supported at one end of a pickup arm 5, which is pivoted at its opposite end about a vertical axis to permit the reproducer to move across the face of the record as the needle of the reproducer follows the groove of the record.

Fig. 2, which is a side elevation of the record-changing apparatus, shows in greater detail the manner in which a number of unplayed records 6 are supported above the turntable on diametrically opposite record supports 7—7 secured to and extending upwardly from the base plate 1. The apparatus disclosed in this application for supporting the records and for moving them one at a time to the turntable has been claimed in application Serial No. 320,278, filed February 23, 1940. Supporting brackets 9 and 10 are provided at the upper ends of the record supports 7—7. These brackets engage opposite peripheral edge portions of the lowermost supported record in the manner shown in the drawings. Flanged portions 11 and 12 on the brackets 9 and 10 support the ten-inch or smaller records. When the brackets 9 and 10 are rotated 90 degrees in a manner presently to be described, flanged portions 13 and 14 (see Fig. 5) on these brackets support the twelve-inch or larger records.

Each one of the brackets 9 and 10 is mounted upon the upper end of a tubular shaft 15 which is rotatable about a vertical axis within the supports 7—7. Secured to the lower end of each one of the shafts 15 are sprocket wheels 16, clearly shown in Fig. 4 and joined by a link chain 17 so that they move in unison to corresponding supporting positions. It is evident that manual manipulation of either one of the brackets 9 or 10 in this joined relationship, from supporting position for smaller records to supporting position for larger records or vice versa, causes a simultaneous movement of the other support to the corresponding supporting position. In a similar fashion, both brackets 9 and 10 may be rotated together to a position so that the played records may be removed readily from the turntable. When the brackets are in supporting position for a stack of either smaller or larger records, they may be locked in a manner hereinafter to be described in greater detail.

The turntable 2 is provided with a centering spindle 18 which extends upwardly and terminates in a tapered portion 19, which greatly facilitates loading records upon the brackets 9 and 10. The centering spindle is provided with a notch 20 formed in one side of the spindle at approximately the elevation of the lowermost supported record. The movement of the notched centering spindle about its axis is timed with the reciprocatory movement of a plunger 21 on the bracket 10, presently to be described in greater detail. The plunger 21 is arranged to engage the edge of the lowermost supported record, moving it laterally so that the central aperture of the record moves into the notch 20 of the centering spindle and the opposite peripheral edge of the record moves into a notch 22 in the bracket 9. The notches 22 and 20 permit the record to move sufficiently far to the left so that the right-hand edge of the record (as shown in Fig. 2) drops off of the bracket 10.

When the lowermost supported record has been moved laterally in this manner to the position shown in the fragmentary view of Fig. 6, the record is freed from the right-hand support, as previously stated, and begins to fall at an angle to the turntable as shown in Fig. 7. The centering spindle 18 has a reduced portion 23 which permits the released record to drop at an angle. When the record is at such angle, the rotation of the centering spindle pulls the left edge of the record from its supporting bracket, thus allowing it to be guided by the centering spindle into playing position upon the turntable.

The left-hand bracket 9 has a spring-biased pin 24, presently to be described in greater detail, which prevents the lowermost record from moving laterally by vibration or otherwise into releasing position prior to the time when the record is moved by the action of the plunger 21 provided on the bracket 10.

The turntable 2 is driven by a friction wheel 25, shown by dotted lines under the left-hand flange of the turntable in Fig. 2. The friction wheel is operatively connected to a driving means or a shaft 26 which is driven by an electric motor 27.

The detailed construction of the right-hand support is shown in Fig. 8. The bracket 10 is provided with a pair of channels 28 and 29. The channel 28 guides the reciprocating plunger 21 and the channel 29 guides a reciprocating plunger 30. Each of the plungers is biased by a respective spring 31 and 32 to the position shown in Fig. 8. Each plunger is actuated and moved against the bias of its spring by a pin 33, which extends through the hollow shaft 15 and is arranged to be movable within the shaft by the provision of a bearing 34 positioned near the midpoint of the pin. Fixedly secured to the lower end of the pin 33 is a cam 35, normally biased by the springs 31 or 32 into a forward position into the path of movement of the pin 36 provided on a cam gear 37. The cam 35 is guided in a reciprocatory motion by a channel 38 provided in a supporting bracket 39. The motion of the cam and lower end of the pin 33 is transmitted to the upper end of the pin and thereby to one of the plungers 21 or 30. When the bracket 10 is in the position shown in Fig. 8, the spring-biased plunger 21 is moved in response to the motion of the pin 33, thus disengaging ten-inch or smaller records from the flange 12. Counter-clockwise rotation of the bracket 10 through an angle of 90 degrees places the plunger 30 in position to be actuated by the pin 33 to disengage twelve-inch or larger records from the flange 14.

The cam gear 37 of Fig. 8 is shown in complete form in the upper portion of Fig. 4. It will be noted that several teeth have been removed at 40 to provide a mutilated portion. The purpose of the mutilation is to break the driving connection between this gear and a small pinion 41, fixedly secured to a shaft 42, which supports and moves with the turntable, after each complete revolution of the gear 37. One complete revolution of the gear 37 defines one complete cycle of record-changing operations as will be evident later.

The gear 37 is provided with a cam surface 43. An arm 44 is pivoted intermediate its ends on a bracket 45 and carries on one end a roller 46 which is biased by a spring 47 into engagement with the cam surface 43. The arrangement of these elements is shown clearly in Figs. 3 and 4 of the drawings. The roller 46, in following the cam surface 43 as it rotates, moves the left-hand end of the arm 44 vertically upward. This upward movement of the left-hand end of the arm 44 vertically raises a pin 48 in a hollow shaft 49. The upper end of the pin 48 engages the under side of the pickup arm 5, thus raising the reproducer 4 from the surface of the record 3.

The pickup arm 5 is supported on the upper end of the hollow shaft 49 which is rotatable within a pedestal 50. The pedestal is secured to the base plate 1. A lever 51 is affixed to the lower end of the hollow shaft 49. It will be evident that horizontal movement of the lever 51 effects a corresponding movement to the pickup arm 5 and vice versa. Referring particularly to Fig. 4, it will be seen that the lower end of the lever 51 supports a pin 52 which moves within an aperture 53 provided in the heel of an L-shaped lever 54. The aperture 53 is sufficiently large so that the pin 52 may move freely with the lever 51 over a wide arc corresponding to the movement of the pickup arm while playing a record. The lever 54 is pivoted at 55. The toe 56 of the lever 54 engages the surface of a cam 57 provided on the gear 37. The toe is biased continuously toward the cam surface by a biasing spring 58. After the reproducer has been raised from the surface of the record in the manner previously described, and as the gear 37 continues to rotate, the cam 57 moves the lever 54 in counterclockwise rotation about its axis 55 and causes the right-hand side of the aperture 53 to engage and drive before it the pin 52. The pin moves the lever 51 and therewith the pickup arm and the reproducer. The pickup arm moves in a radial direction away from the center of the record. The cam 57 is so shaped that the lever 54 ceases its counterclockwise rotation at a time when the reproducer has been moved beyond the edge of the phonograph records on the turntable.

After the pickup arm and reproducer have been moved beyond the periphery of the played record on the turntable, the gear 37 continues to rotate and the pin 36 thereon engages the cam 35 to cause the lowermost record of the stack to be dropped into playing position on the turntable in the manner previously described. Shortly thereafter, the cam 57 has moved to a point where the toe 56 of the lever 54 begins to move to the right under action of the spring 58. When this occurs, the left-hand edge of the aperture 53 engages the pin 52 and moves the pin, the lever 51 and the pickup arm and reproducer to a position where the reproducer needle is over the initial groove of the new record.

By this time the cam 43 has rotated to the position shown in Fig. 3 where the contour of the cam permits the left-hand end of the lever 44 to drop vertically downward, thereby returning the needle of the reproducer 4 to playing engagement with the new record placed on the turntable.

The automatic record-changing cycle effected by a complete revolution of the gear 37 is initiated by the automatic trip mechanism, previously mentioned, which will now be described in greater detail. The pickup arm 5, which has been lowered to place the phonograph needle in engagement with the initial groove of the new record, is moved inwardly by the spiral groove on the record. In moving toward the center of the record, the pickup arm moves with it the hollow shaft 49. The hollow shaft has secured to it a clutch 59, the detailed construction of which will be described hereinafter, which frictionally engages a lever 60. Referring particularly to Fig. 4, a lever 61 is supported pivotally at one end for rotation about the shaft 49. Thus, as a record is being played and as the pickup arm moves toward the center of the record, the clutch 59 moves the lever 60 in a counterclockwise direction as shown in Fig. 4. The lever 60 engages the side of the lever 61 (more clearly shown in Fig. 3) and likewise moves it in a counterclockwise direction. The free end of lever 61 preferably is turned at right angles and engages the lower end of a lever 62 which is pivoted intermediate its ends. The upper end of the lever 62 engages the upper end of a lever 63 which is pivoted intermediate its ends (as shown in Fig. 4) and which is affixed to the gear 37. The upper end of lever 63 tends to move away from the gear 37 and the lower end tends to move toward it and into the path of movement of a pin 64 which is secured to the same shaft that supports the small pinion 41.

Each time the gear 37 makes a complete revolution, the upper end of lever 63 engages the upper end of lever 62, which is shaped so that its engagement with lever 63 causes the upper end thereof to move toward the surface of gear 37 and the lower end to move out of the path of the pin 64.

As the pickup arm approaches the inner groove of a record, it moves the levers 60, 61 and 62 in counterclockwise direction. The lower end of the lever 62 carries a leaf spring 65 which lies in the path of movement of a cam 66 secured to the shaft 41. The cam 66 periodically strikes the spring 65 and moves the lever 62, and with it the levers 61 and 60, in a clockwise direction, the lever 60 changing its position with respect to the pickup arm by virtue of the clutch 59. When the needle at the end of the pickup arm moves into the eccentric groove, customarily provided as the inner groove of the record, the lever 60 can be moved by the cam 66 in a clockwise direction only against the biasing action of a spring 67, as will presently be shown in greater detail when the construction of the clutch 59 is considered. When this occurs, the cam 66 may temporarily move the levers 62, 61 and 60 clockwise, but these levers are immediately thereafter returned in a counterclockwise direction by the action of the spring 67 on the lever 60. The return movement is sufficiently great so that the lever 62 is moved out of engagement with the lever 63. The lower end of lever 63 thereupon moves in the path of the pin 64. As the pin 64 rotates, it engages the lower end of the lever 63 and moves the lever, and therewith the gear 37, sufficiently far so that the teeth of the gear 37 mesh with the teeth of the pinion 41, after which the pinion continues to drive the gear 37 through a complete revolution to effect the cycle of automatic record changing heretofore described.

A fixed stop 68 is secured to the base plate 1 with an upturned end 69 positioned in the path of movement of the lever 60. As the pickup arm is swung beyond the edge of the records during a record-changing cycle, it moves the lever 60 in a clockwise direction (Fig. 4) into engagement with the stop 68. The engagement of the lever 60 and the stop 68 is effected, however, before the pickup arm has swung to its outermost position, the lever 60 changing its angular position relative to the pickup arm through the slipping connection between the pickup arm and the lever which is provided by the clutch 59. This positions the lever 60 well forward of the pickup arm as the pickup arm is returned toward the center of the record and ensures a positive engagement of the elements 60, 61 and 62 prior to the time when the needle of the reproducer is in the innermost groove of the record.

The construction of the clutch is shown in detail in Fig. 10. The clutch and tripping mechanism herein disclosed have been disclosed and claimed in divisional application Serial No. 393,600, filed May 15, 1941. A flanged sleeve 70 is fixed to the shaft 49 which also supports the pickup arm. A plate 71 with the lever 60 and an ear 71A extending from it is mounted in frictional relationship with the surface of the flange of the member 70. A suitable fiber washer 71B is slipped over the plate 71. A plate 72 with a turned-down ear 72A is placed over the fiber washer 71B. A spring washer 72B is placed over the plate 72. A flanged cover member 73 is screwed on the sleeve of member 70 so that the bottom of the flanged portion of the cover member 73 rests on the spring washer 72B. The spring washer 72B maintains an even frictional engagement between the plate 72 and the fiber washer 71B, when the members 70 and 73 are screwed together. The spring 67 is connected to the outer flange of member 70 and the turned-down ear 72A. The turned-down ear 72A and the ear 71A are so related that, when the pickup arm reaches the inner groove of the record, the cam 66 through the levers 60, 61, and 62 moves the ears 71A and 72A in a counterclockwise direction (as shown in Fig. 4) against the tension of spring 67. When the cam 66 moves out of relationship with the levers 60, 61 and 62 the tension of spring 67 moves levers 60, 61 and 62 with enough force to release the upper end of lever 63 from engagement with lever 62 thus initiating a record-changing cycle.

When the record-supporting brackets 9 and 10 are in the position shown in Fig. 2, the respective flange portions 11 and 12 engage the peripheral edges of ten-inch or smaller records and support them above the turntable 2. When the brackets 9 and 10 are rotated manually 90 degrees, as illustrated in Fig. 5, the flange portions 13 and 14 engage the peripheral edges of twelve-inch or larger records and support them above the turntable. The brackets 9 and 10 are locked in a selected position by the provision of a locking cam 74 (Fig. 4) secured to the lower end of the shaft 15 which supports at its upper end the bracket 9. The cam 74 is provided with notches 75, 76 and 77 which are engaged by a pin 78 fixedly secured to the right-hand end of a lever 79. The lever 79 is pivoted intermediate its ends as shown in Fig. 4. A spring 80 is affixed to the left-hand end of the lever for normally biasing the pin 78 into continuous engagement with one of the notches 75, 76 and 77. When the notch 75 engages the pin 78 the brackets 9 and 10 are in position to support the smaller records. When the notch 76 engages the pin 78 the brackets 9 and 10 are in position to support the larger records. And when the notch 77 engages the pin 78 the brackets 9 and 10 are out of any supporting position, thus allowing the easy removal of the played records from the turntable.

It will be noted that the left-hand end of the lever 79 extends into engagement with a set screw 81 which is provided near the lower end of the lever 54. The contour of the cam 74 is such that the left-hand end of the lever 79 allows less clockwise movement of the lever 54 under action of the biasing spring 58 when the apparatus is set to operate on larger rather than smaller records. This limited angular movement of the lever 54 insures that the pickup arm is returned properly to the initial groove of larger records, a return which it will be appreciated is less than that required where the pickup arm is returned to the initial groove of smaller records. Thus, it is evident that the manual positioning of the brackets 9 and 10 for supporting either a stack of smaller or larger records automatically sets the mechanism for positioning the pickup arm and reproducer in proper position to engage the initial groove of the size of record that is about to be played.

Fig. 4 clearly shows the manner in which the link chain 17 mechanically connects the sprocket wheels 16 which are fixedly secured to the lower ends of the shafts 15. The link chain 17 is maintained under tension by a pair of idler pulleys 82.

The detailed construction of the turntable control mechanism is shown in Figs. 1, 4, 11 and 12 of the drawings. Referring particularly to Fig. 1, the control mechanism includes a knob 83 which is pivoted about a vertical shaft 84 (Fig. 12) to move across the face of a dial 85. Any manual movement of the knob 83 is transmitted by the shaft 84 to a ratchet 86, secured to the lower end of said shaft as shown in Fig. 4.

The ratchet 86 normally is biased upwardly (see Figs. 11 and 12) by the action of a spring 88 arranged to engage the under side of the knob 83, as shown in Fig. 12, into the path of movement of a spring-biased catch 87.

An arm 89 provided on the lever 54 supports the spring-biased catch 87. Referring particularly to Figs. 4 and 11 of the drawings, when the lever 54 moves in a counterclockwise direction, as shown in Fig. 4 or clockwise, as shown in Fig. 11, about its axis 55 during the record-changing cycle, it causes the spring-biased catch 87 to engage and drive before it the ratchet 86. The ratchet is moved about its axis the distance of one notch and in doing so it moves the knob 83 from one number to the next succeeding number on the dial 85 (Fig. 1). When the lever 54 is moved in the opposite direction during the record-changing cycle, the catch 87 moves in a direction against the biasing action of a spring 90 (Fig. 4) as it is moved out of engagement with the ratchet 86.

The knob 83 is provided with a pair of small arms 91 and 92 shown in Fig. 4. The arm 91 engages an electric switch 93 connected in circuit with the power supply to the motor 27 (more clearly shown in Fig. 12), and the arm 92 engages a lever 94 as shown in Fig. 4. When the knob 83 is manually rotated from the zero or "off" position on the dial 85 to a number corresponding to the number of records on the supports or to the number of records which the operator wishes to play, the arm 91 moves the switch 93 to its "on" position and the arm 92 likewise moves the lever 94 in a clockwise direction, as shown in Fig. 4 and a counterclockwise direction, as shown in Fig. 11. The lever 94 is pivoted intermediate its ends as shown in Fig. 4. The upper end of the lever 94 is formed at right angles to the lever and engages a connecting means or a spring-biased lever 95 in the manner shown in Fig. 11.

The lever 95 is pivoted to the base plate 1 at 96. When the lever 94 is moved in the manner previously described, the lever 95 is moved in a counterclockwise direction about its axis 96 and causes a braking means or a brake block 97 to move out of engagement with the rim of the turntable 2 and likewise causes a tapered end 98 to move out of engagement with a plate 99 which supports the friction wheel 25. The plate 99 and the friction wheel 25 are referred to herein as connecting means or first connecting means. The disengagement of the elements 98 and 99 permits a spring or resilient means 100 to move the plate 99 sufficiently far to cause the friction wheel 25 to engage the shaft 26, which is driven by the motor 27 and thereupon drives the turntable in the manner previously described.

The operation of the play-control device will now be described. The knob 83 is manually pushed downwardly against the biasing action of the spring 88, and rotated in a clockwise direction to the number on the dial 85 corresponding to the number of records to be played. The knob in moving actuates the switch 93 and likewise moves the lever 94 in a counterclockwise direction (Fig. 11). Thus the phonograph apparatus is set in operation. During the cycle of record changing, when the lever 54 moves in a counterclockwise direction (Fig. 4), it causes the member 87 to engage the ratchet 86 and moves the ratchet and the knob 83 in a counterclockwise direction the distance of one notch, as previously described. The ratchet moves counterclockwise one notch for each record-changing cycle. When the last record is completely played and the mechanism is tripped, the arm 92 moves the lever 94 to the position shown in Fig. 11 of the drawings, thereupon permitting a spring or resilient means 101 to move the lever 95 in a clockwise direction sufficiently far to cause the tapered end 98 to move the plate 99 and therewith the friction wheel 25 out of engagement with the shaft 26, thereafter causing the brake block 97 to engage the rim of the turntable 2. Immediately thereafter the arm 91 moves the switch 93 to its "off" position. Thus, the brake is applied to the turntable and the record-changing apparatus automatically is shut off after all of the records have been completely played.

In addition to the automatic trip mechanism previously described, there is also provided a manual, spring-biased trip lever 102 (Fig. 4) whose lower end is bent and extends through a slotted aperture in the supporting panel 1 to support on its end a small knob 103 (Fig. 1). The lever 102 is normally biased by a spring 104 out of engagement with the turned-over lower end of the lever 62 but may be manually moved to engage the lower end of the lever 62, thereby moving the upper end of the lever out of engagement with the trip lever 63 to manually trip the mechanism and initiate a record-changing cycle.

The detailed construction of the record-supporting bracket 9 is shown in Fig. 9. The bracket is provided with the plunger 24 and a plunger 105 which extend into the notch 22 and a notch 106, respectively. A channel 107 is provided to guide in a reciprocatory motion the plunger 24 which is normally biased by a spring 107 to the position shown in the drawing. The plunger 105 is supported and biased in a manner similar to that of the plunger 24. The purpose of the plungers 24 and 105 is to prevent the lowermost record of the stack from moving laterally under the action of mechanical vibration until the record is deliberately moved from its supports to the turntable.

A modified centering spindle construction is shown in Fig. 5. The upper end of the spindle 18 is reduced at 108 from the top to a point below the plane of the lowermost supported record. This construction facilitates loading and unloading of records.

The general mode of operation of the record-changing apparatus will now be briefly described. After a stack of records has been placed upon the brackets 9 and 10, the knob 83 is pushed down and rotated manually in a clockwise direction to the number on the dial 85 corresponding to the number of records to be played. The knob in moving actuates the switch 93 and likewise releases the brake 97, thereupon setting the phonograph apparatus in operation. When the switch 93 turns on the motor, it sets in motion the mutilated gear 37 which meshes with pinion gear 41. After gear 37 begins to rotate, the pin 36 affixed thereto engages the cam 35 which in turn transmits a reciprocatory action to plunger 21 (or 30, depending upon the setting of brackets 9 and 10). The plunger 21 engages the edge of the lowermost supported record on brackets 9 and 10 and moves it in a direction normal to the axis of the spindle sufficiently far so that the right-hand edge of the record drops off of its supporting bracket (see Figs. 6 and 7). The rotation of the spindle then pulls the left-hand edge of the record off its supporting bracket. This completely releases the record and it moves into playing position upon the turntable. The gear 37 has by this time rotated sufficiently far so that the cam 57 allows the lever 54 to move in a clockwise direction under the action of the biasing spring 58, thereupon moving the pickup arm and reproducer to a position where the needle of the reproducer is over the starting groove of the record just placed upon the turntable.

At this time the cam 43 on gear 37 allows lever 44 to move so that pin 48 may drop vertically downward. This allows the pickup arm and reproducer to move downwardly so that the needle of the reproducer engages the starting groove of the uppermost record on the turntable. When the pickup arm reaches the inner groove of the record the automatic tripping mechanism is operated by the corresponding movement of the levers 60, 61 and 62, by virtue of the cam rotating with shaft 41 and the clutch mechanism affixed to shaft 49. The levers 62 and 63 disengage to permit the lower end of the lever 63 to move into the path of the pin 64 provided on the shaft of the pinion gear 42. Engagement of the pin 64 with the lower end of the lever 63 causes the gear 37 to be rotated until the teeth of this gear mesh with those of the pinion 41, after which the gear 37 is driven by the pinion. As the gear 37 rotates, the cam surface 43 moves the lever 44 and raises the reproducer off of the record.

Continued movement of the gear 37 causes the cam surface 57 to move the lever 54 and therewith the lever 51 to swing the pickup arm beyond the edge of the played record. The lever 54 in moving outwardly causes the spring-biased catch 87 to engage and move before it the ratchet 86 and the knob 83 in a counterclockwise direction, the distance of one notch. Shortly thereafter, the pin 36 on the gear 37 engages the cam 35 and another record is released from the supports for reproduction on the turntable. This operation has already been explained.

The next and following cycles of automatic operations are initiated by the automatic trip mechanism each time the reproducer needle moves to the last groove of the record. Each time a record-changing cycle is initiated, the ratchet 86 and the knob 83 are rotated in counterclockwise direction the distance of one notch on the ratchet to the next succeeding number on the dial 85. When the last record is completely played and the mechanism is tripped to initiate a record-changing cycle, the ratchet 86 and therewith the knob 83 are moved to the zero or the "off" position. Immediately thereafter, the lever 94 is moved in a clockwise direction sufficiently far to allow the spring 101 to move the lever 95 in a clockwise direction. The end 98 of lever 95 engages and moves the plate 99 sufficiently far to break the driving engagement between the friction wheel 25 and 26. Thereafter the roller on brake 97 mounted on one leg of lever 95 engages the rim of the turntable 2 to stop it. The switch 93 then is moved to its "off" position and the mechanism is thereupon completely shut off.

While there has been described what is at present considered to be the preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In an automatic phonograph having a turntable with a peripheral flange and a continually rotating shaft, a turntable control mechanism comprising a movable member having a friction member rotatably connected thereto, a spring connected to said movable member for normally holding said friction member in operative engagement with said shaft and said peripheral flange for driving said turntable, indicator means associated with said movable member and adapted to be moved manually to an on-position for permitting said friction member to be moved into operative position and automatically to an off-position for moving said friction member into inoperative position, and a pickup arm adapted to cooperate with a record on said turntable for automatically moving said indicator means to an off-position after a predetermined number of records have been played on the turntable.

2. In an automatic phonograph having a turntable with a peripheral flange and a continually rotating shaft, a turntable control mechanism comprising a movable member having a friction member rotatably connected thereto, a spring connected to said movable member for normally holding said friction member in operative engagement with said shaft and said peripheral flange for driving said turntable, indicator means associated with said movable member and adapted to be moved manually to an on-position for permitting said friction member to be moved into operative position and automatically to an off-position for moving said friction member into inoperative position, a pickup arm adapted to cooperate with the record on said turntable, and a pickup arm control means responsive to the movement of said pickup arm when it reaches the tripping groove of a record on said turntable and adapted to move said indicator means to an off-position after a predetermined number of records have been played.

3. In an automatic phonograph having a turntable with a peripheral flange and a continually rotating shaft, a turntable control mechanism comprising a first member having a friction member rotatably connected thereto, a first spring connected to said first member for normally holding said friction member in operative engagement with said shaft and said peripheral flange for driving said turntable, a second member associated with said first member and being adapted to move said friction member out of operative position, indicator means associated with said second member and adapted to be moved manually to on-position for permitting said friction member to be moved into operative position and automatically to an off-position for moving said friction member into inoperative position, and a pickup arm adapted to cooperate with a record on the said turntable for automatically moving said indicator means to an off-position after a predetermined number of records have been played on the turntable.

4. In an automatic phonograph having a turntable with a peripheral flange and a continually rotating shaft, a turntable control mechanism comprising a first member having a friction member rotatably connected thereto, a first spring connected to said first member for normally holding said friction member in operative engagement with said shaft and said peripheral flange for driving said turntable, a second member associated with said first member and being adapted to move said friction member out of operative position, a braking member associated and movable with said second member and being adapted to be moved into frictional engagement with said peripheral flange, a second spring connected to said second member and normally maintaining said friction member out of operative position and maintaining said braking member in frictional engagement with said peripheral flange, indicator means associated with said second member and adapted to be moved manually to an on-position for permitting said friction member to be moved into operative position and said braking member to inoperative position and automatically to an off-position for moving said friction member into inoperative position and said braking member into operative position, and a pickup arm adapted to cooperate with a record on said turntable for automatically moving said indicator means to said off-position after a predetermined number of records have been played on the turntable.

5. In an automatic phonograph having a turntable with a peripheral flange, a motor, and a motor shaft, a turntable control mechanism comprising a movable member having a friction member rotatably connected thereto, a spring connected to said movable member for normally holding said friction member in operative engagement with said motor shaft and said peripheral flange for driving said turntable, indicator means associated with said movable member and adapted to be moved manually to an on-position for permitting said friction member to be moved into operative position and automatically to an off-position for moving said friction member into inoperative position, means associated with said indicator means for starting said motor when said indicator means is moved to said on-position and stopping said motor when said indicator means is moved to said off-position, and a pickup arm adapted to cooperate with a record on said turntable for automatically moving said indicator means to an off-position after a predetermined number of records have been played on the turntable.

6. In an automatic phonograph having a turntable with a peripheral flange, a motor, and a motor shaft, a turntable control mechanism comprising a movable member, a braking member associated with said movable member for being moved into frictional engagement with said peripheral flange, a spring connected to said movable member for normally maintaining said braking member in frictional engagement with said peripheral flange, indicator means associated with said movable member and adapted to be moved manually to an on-position for moving said braking member into inoperative position and automatically to an off-position for permitting said braking member to be moved into operative position, means associated with said indicator means for starting said motor when said indicator means is moved to said on-position and for stopping said motor when said indicator means is moved to said off-position, and a pickup arm adapted to cooperate with a record on said turntable for automatically moving said indicator means to an off-position after a predetermined number of records have been played on the turntable.

7. In an automatic phonograph having a turntable with a peripheral flange and a continually rotating shaft, a turntable control mechanism comprising a first member under said turntable having a friction member rotatably connected thereto, a first spring connected to said first member for normally holding said friction member in operative engagement with said shaft, and said peripheral flange for driving said turntable, a second member associated with said first member and being adapted to move said friction member out of operative position, said second member being positioned under said turntable, a braking member associated with said second member for being moved into frictional engagement with said peripheral flange, a second spring connected to said second member and normally maintaining said friction member out of operative position and normally maintaining said braking member in frictional engagement with said peripheral flange, indicator means associated with said second member and adapted to be moved manually to an on-position for permitting said friction member to be moved into operative position and said braking member to inoperative position and automatically to an off-position for moving said friction member into inoperative position and said braking member into operative position, and a pickup arm adapted to cooperate with a record on said turntable for automatically moving said indicator means to said off-position after a predetermined number of records have been played on the turntable.

8. In an automatic phonograph having a turntable and driving means, a turntable control mechanism comprising movable connecting means for operatively connecting said turntable to said driving means for driving said turntable, resilient means connected to said movable connecting means for normally holding said movable connecting means in said operative position, indicator means associated with said movable connecting means and adapted to be moved to an on position for permitting said movable connecting means to move into operative position and automatically to an off-position for moving said movable connecting means out of said operative position, and a pickup arm adapted to cooperate with a record on said turntable for automatically moving said indicator means to said off-position after a predetermined number of records has been played on the turntable.

9. In an automatic phonograph having a turntable and driving means, a turntable control mechanism comprising first movable connecting means for operatively connecting said turntable to said driving means for driving said turntable, first resilient means connected to said first movable connecting means for normally holding said first movable connecting means in said operative position, second movable connecting means associated with said first movable connecting means and having a braking means thereon, second resilient means for normally maintaining said second movable connecting means out of operative position whereby said first movable connecting means is held out of its operative position and said braking means is maintained in frictional engagement with said turntable, indicator means associated with said second movable connecting means and adapted to be moved to an on-position for moving said second movable connecting means into operative position and automatically to an off-position for moving said second movable connecting means to its inoperative position, and a pickup arm adapted to cooperate with a record on said turntable for automatically moving said indicator means to said off-position after a predetermined number of records has been played on the turntable.

10. In an automatic phonograph having a turntable, a motor with a driving member, a turntable control mechanism comprising movable connecting means for operatively connecting said turntable to said driving member for driving said turntable, resilient means connected to said movable connecting means for normally holding said movable connecting means in said operative position, indicator means associated with said movable connecting means and adapted to be moved to an on-position for permitting said movable connecting means to move into operative position and automatically to an off-position for moving said movable connecting means out of said operative position, means associated with said indicator means for starting said motor when said indicator means is moved to said on-position and stopping said motor when said indicator means is moved to said off-position, and a pickup arm adapted to cooperate with a record on said turntable for automatically moving said indicator means to an off-position after a predetermined number of records has been played on the turntable.

ARTHUR L. KNOX.
FRITZ KAHL.